United States Patent
Jo et al.

(10) Patent No.: US 10,626,516 B2
(45) Date of Patent: Apr. 21, 2020

(54) ELECTROLYTIC COPPER FOIL FOR GRAPHENE AND METHOD FOR PRODUCING THE COPPER FOIL

(71) Applicant: ILJIN MATERIALS CO., LTD., Iksan (KR)

(72) Inventors: Tae Jin Jo, Iksan (KR); Sun Hyoung Lee, Iksan (KR); Seul-Ki Park, Iksan (KR); Ki Deok Song, Iksan (KR)

(73) Assignee: ILJIN MATERIALS CO., LTD., Iksan (KR)

( * ) Notice: Subject to any disclaimer, the term of this patent is extended or adjusted under 35 U.S.C. 154(b) by 0 days.

(21) Appl. No.: 16/088,910

(22) PCT Filed: Mar. 21, 2017

(86) PCT No.: PCT/KR2017/003007
§ 371 (c)(1),
(2) Date: Sep. 27, 2018

(87) PCT Pub. No.: WO2017/188601
PCT Pub. Date: Nov. 2, 2017

(65) Prior Publication Data
US 2019/0071790 A1 Mar. 7, 2019

(30) Foreign Application Priority Data

Apr. 28, 2016 (KR) .................. 10-2016-0052528

(51) Int. Cl.
| | | |
|---|---|---|
| *B21C 37/00* | (2006.01) | |
| *C25D 7/06* | (2006.01) | |
| *C25D 3/38* | (2006.01) | |
| *C01B 32/186* | (2017.01) | |
| *C25D 1/04* | (2006.01) | |
| *C25D 5/50* | (2006.01) | |
| *C01B 32/182* | (2017.01) | |
| *B82Y 30/00* | (2011.01) | |
| *B82Y 40/00* | (2011.01) | |

(52) U.S. Cl.
CPC .......... *C25D 7/0614* (2013.01); *C01B 32/182* (2017.08); *C01B 32/186* (2017.08); *C25D 1/04* (2013.01); *C25D 3/38* (2013.01); *C25D 5/50* (2013.01); *B82Y 30/00* (2013.01); *B82Y 40/00* (2013.01); *Y10T 428/12431* (2015.01); *Y10T 428/12438* (2015.01)

(58) Field of Classification Search
None
See application file for complete search history.

(56) References Cited

U.S. PATENT DOCUMENTS

2007/0098910 A1* 5/2007 Yamagata ................ C25D 1/04
427/409

FOREIGN PATENT DOCUMENTS

| EP | 0857402 | * 12/2007 | ............... H05K 1/00 |
|---|---|---|---|
| JP | 2001-123290 A | 3/2001 | |
| JP | 2013107036 | * 6/2013 | ............. B01J 23/72 |
| KR | 10-2000-0064294 A | 11/2000 | |
| KR | 10-0364685 B1 | 4/2003 | |
| KR | 10-0560672 B1 | 3/2006 | |
| KR | 10-2014-0043133 A | 4/2014 | |
| WO | 2011/129633 A2 | 10/2011 | |
| WO | WO2011129633 | * 10/2011 | ............... C25D 3/38 |

* cited by examiner

*Primary Examiner* — Seth Dumbris
(74) *Attorney, Agent, or Firm* — Patent Office of Dr. Chung Park

(57) ABSTRACT

The present disclosure relates to an electrolytic copper foil for graphene and a method for producing the copper foil, in which, in the manufacture of the electrolytic copper foil for graphene, addition of nickel facilitates the synthesis of the graphene. The addition of nickel which serves as a seed in the synthesis of graphene on electrolytic copper foil reduces the electrical conductivity after graphene synthesis. As a result, graphene is uniformly formed on the surface of the copper foil. Further, the present disclosure may provide the electrolytic copper foil for graphene and the method for producing the copper foil in which an electrolytic copper foil having a resistance value of less than 300 ohm/square after the synthesis of the graphene on the electrolytic copper foil is produced, thereby, facilitate the formation of graphene on the electrolytic copper foil.

3 Claims, No Drawings

ELECTROLYTIC COPPER FOIL FOR GRAPHENE AND METHOD FOR PRODUCING THE COPPER FOIL

BACKGROUND

1. Technical Field

The present disclosure relates to an electrolytic copper foil for graphene and a method for producing the copper foil. More particularly, the present disclosure relates to an electrolytic copper foil for graphene and a method for producing the copper foil, in which, in the manufacture of the electrolytic copper foil for graphene, addition of nickel may facilitate the synthesis of the graphene.

2. Description of Related Art

A graphene is a term made by combining the graphite used as a pencil lead and the suffix "-ene" representing a molecule with carbon double bonds. Graphite has a structure in which carbon layers of hexagonal honeycomb are stacked. The graphene may be considered to be one thinnest layer as removed from the graphite. The graphene, a carbon isotope, is a nanomaterial composed of carbon atoms such as carbon nanotubes and Fullerene. Graphene has a two-dimensional planar shape. The thickness of the graphene is 0.2 nm (1 nm is one-billionth of one meter), which is extremely thin. That is, the thickness of graphene is extremely thin, that is, about two-billionths of one meter. Furthermore, the physical and chemical stability of graphene is high.

Further, graphene has more than 100 times more electricity than copper. Graphene can move electrons more than 100 times faster than monocrystalline silicon, which is mainly used as a semiconductor. The strength of graphene is 200 times stronger than steel. The thermal conductivity of graphene is two times higher than that of diamond with the highest thermal conductivity. Furthermore, the graphene's elasticity is excellent, so that it does not lose its electrical properties even when it is stretched or bent.

Due to these properties, graphene is regarded as a material that goes beyond carbon nanotubes, which are attracted by the next generation of new materials, and is called a dream nanomaterial. Graphene and carbon nanotubes have very similar chemical properties. In those materials, metallic and semiconducting properties may be separated from each other by a post-process. However, because graphene has a more uniform metallicity than carbon nanotubes, the graphene is more likely to be applied industrially. Further, graphene is attracting attention as a future-oriented new material in the electronic information industry, which may allow production of bendable displays, electronic paper, and wearable computers.

In 2004, the Geim and Novoselov teams at the University of Manchester became the first to succeed in separating atomic layers from graphite with Scotch tape. As a result, graphene was invented. They were awarded the 2010 Nobel Prize in Physics. In 2010, roll-to-roll technology, which transfers 30-inch large-area graphene was developed. In 2013, a specific roll-to-roll graphene synthesis technology that goes beyond the idea level has been unveiled. Thereafter, the development of graphene continues to be commercialized.

However, it is important to uniformly realize a single-layer graphene thin film in order to utilize graphene industrially. The number of layers of the graphene sheet as obtained by the method of peeling the graphene using the adhesive tape is not constant. In this case, a large-area graphene sheet is not easily obtained. This method has a problem that it is not suitable for mass production.

Further, in the prior art, there is a problem that multi-layer graphene on the copper foil is distributed in an island shape and grows non-uniformly, and amorphous carbon coexists with graphene/As a result, it is difficult to obtain clean single-layer graphene and, thus, the conductivity is deteriorated.

DISCLOSURE OF INVENTION

Technical Purposes

The present disclosure is to provide an electrolytic copper foil for graphene and a method for producing the copper foil in which, in the synthesis of graphene on the electrolytic copper foil, adding nickel serving as a seed may allow lowering an electrical conductivity after graphene synthesis.

Further, the present disclosure is to provide an electrolytic copper foil for graphene and a method for producing the copper foil in which an electrolytic copper foil having a resistance value of less than 300 ohm/square after the synthesis of the graphene on the electrolytic copper foil is produced, thereby, facilitate the formation of graphene on the electrolytic copper foil.

Technical Solutions

In one embodiment of the present disclosure, there is provided an electrolytic copper foil for graphene, wherein the electrolytic copper foil has a tensile strength of 45 to 70 $kgf/mm^2$ at a room temperature, wherein the electrolytic copper foil after thermal treatment has a tensile strength of 20 to 35 $kgf/mm^2$ at a room temperature.

Further, the thermal treatment may be carried out at a temperature of 180 to 220 degrees Celsius for 50 to 80 minutes.

Further, a thickness of the electrolytic copper foil may be 4 to 70 μm.

Further, a resistance of the copper foil after synthesis of the graphene on the electrolytic copper foil for the graphene may be 300 Ω/square or smaller.

In another embodiment of the present disclosure, there is provided a method for producing an electrolytic copper foil for graphene, wherein plating of the copper foil is performed in a copper electrolytic solution under a condition that a nickel concentration in the copper electrolytic solution is kept at 1000 ppm or lower and a chlorine concentration in the copper electrolytic solution is kept at 1 ppm or lower.

Further, plating of the copper foil is performed in a copper electrolytic solution under a condition that a total organic carbon (TOC) concentration in the copper electrolytic solution may be kept at 3 ppm or lower.

Further, when plating the copper foil, a temperature of the electrolytic solution is 30 to 70 degree C. and a current density may be 30 to 140 ASD.

Further, when plating the copper foil, a copper concentration in the electrolytic solution may be 60 to 140 g/L, and a sulfuric acid concentration in the electrolytic solution may be 70 to 200 g/L.

Technical Effects

In accordance with the present disclosure, the addition of nickel which serves as a seed in the synthesis of graphene on electrolytic copper foil reduces the electrical conductivity after graphene synthesis. As a result, graphene is uniformly formed on the surface of the copper foil.

Further, the present disclosure may provide the electrolytic copper foil for graphene and the method for producing the copper foil in which an electrolytic copper foil having a resistance value of less than 300 ohm/square after the synthesis of the graphene on the electrolytic copper foil is produced, thereby, facilitate the formation of graphene on the electrolytic copper foil.

DETAILED DESCRIPTIONS

The details of other embodiments are included in the detailed description and drawings.

The advantages and features of the present disclosure, and how to accomplish them, will become apparent with reference to the embodiments described in detail below with reference to the accompanying drawings. However, the present disclosure is not limited to the embodiments disclosed below but may be implemented in various other forms. In the following description, when a certain portion is connected to another portion, this includes not only the case where they are directly connected but also the case where they are connected via another medium therebetween. Further, parts of the drawing that do not relate to the present disclosure have been omitted to clarify the description of the present disclosure. Like parts are designated with like reference numerals throughout the specification.

Hereinafter, the present disclosure will be described in detail.

The present disclosure relates to an electrolytic copper foil for graphene and a method for producing the copper foil. More particularly, the present disclosure relates to an electrolytic copper foil for graphene and a method for producing the copper foil, in which, in the manufacture of the electrolytic copper foil for graphene, addition of nickel may facilitate the synthesis of the graphene.

In accordance with the present disclosure, the electrolytic copper foil has a tensile strength of 45 to 70 kgf/mm$^2$ at a room temperature. The electrolytic copper foil after thermal treatment has a tensile strength of 20 to 35 kgf/mm$^2$ at a room temperature.

During the process of manufacturing electrolytic copper foil for graphene, graphene was synthesized on electrolytic copper foil. In this synthesis process, the temperature of the electrolytic copper foil will rise to 1000 degrees Celsius. At such a high temperature, the grain of the copper foil surface must be grown to a certain size such that the synthesis of graphene is easy. When the grain grows to the certain size, the tensile strength is lowered to a certain range. In the present disclosure, the range of the tensile strength at room temperature of the electrolytic copper foil where graphene synthesis is easy, and the range of tensile strength measured at room temperature after the thermal treatment thereof where graphene synthesis is easy was measured and defined. The ranges may be as described above. For reference, the thermal treatment of the electrolytic copper foil is preferably performed at a temperature of 180 to 220 degrees Celsius for 50 to 80 minutes.

Further, in one embodiment, the thickness of the electrolytic copper foil may be 4 to 70 μm. When the thickness of the electrolytic copper foil is smaller 4 μm, the electrolytic copper foil tends to be broken and, thus, the handling property in the subsequent process is lowered, which is undesirable. Further, when the thickness of the electrolytic copper foil exceeds 70 μm, the removal via the etching may be poor when the copper foil is removed by the etching after the graphene is synthesized on the electrolytic copper foil.

Further, a resistance of the copper foil after synthesis of the graphene on the electrolytic copper foil for the graphene may be 300 Ω/square or smaller. Otherwise, when the resistance of the copper foil after synthesis of the graphene on the electrolytic copper foil for the graphene exceeds 300 Ω/square, there is a problem that graphene is not properly synthesized on the electrolytic copper foil.

Further, in a method for producing an electrolytic copper foil for graphene in one embodiment of the present disclosure, plating of the copper foil is performed in a copper electrolytic solution under a condition that a nickel concentration in the copper electrolytic solution is kept at 1000 ppm or lower and a chlorine concentration in the copper electrolytic solution is kept at 1 ppm or lower. The nickel serves as a seed when graphene grows. Nickel is doped on the surface of the electrolytic copper foil. This helps graphene form uniformly on the surface of the electrolytic copper foil.

Further, in one embodiment, plating of the copper foil may be performed in a copper electrolytic solution under a condition that a total organic carbon (TOC) concentration in the copper electrolytic solution is kept at 3 ppm or lower. In the present specification, the TOC stands for Total Organic Carbon. This is the term of the amount of carbon in the organic contents contained in the liquid. When the TOC concentration is higher than 3 ppm, there is a lot of impurities in the copper foil, which greatly affects recrystallization. Thus, it is preferable that the TOC value in the plating bath for the electrolytic copper foil has a value of 3 ppm or smaller.

Further, when plating the copper foil, a temperature of the electrolytic solution may be 30 to 70 degree C. and a current density is 30 to 140 ASD. When plating the copper foil, a copper concentration in the electrolytic solution may be 60 to 140 g/L, and a sulfuric acid concentration in the electrolytic solution may be 70 to 200 g/L.

The following is a detailed description of an example of the present disclosure.

Experiment Example 1

Resistance test after graphene synthesis based on the room temperature tensile strength of the electrolytic copper foil for graphene according to the present disclosure, and the room temperature tensile strength of the electrolytic copper foil after thermal treatment thereof.

In Experiment example 1 of the present disclosure, the resistance test after graphene synthesis based on the room temperature tensile strength of the electrolytic copper foil for graphene according to the present disclosure, and the room temperature tensile strength of the electrolytic copper foil for graphene according to the present disclosure after thermal treatment thereof was carried out in order to measure whether the graphene synthesis is easily performed based on the tensile strength. Table 1 below shows a change in resistance value after the graphene synthesis based on the thickness of the electrolytic copper foil, the TOC concentration in the electrolytic solution, the nickel concentration in the electrolytic solution, the tensile strength at room temperature, and the tensile strength at room temperature after thermal treatment.

In the present example 1 to the present example 8 in the following table 1, the electrolytic copper foil has a tensile strength of 45 to 70 kgf/mm$^2$ at a room temperature, and the electrolytic copper foil after thermal treatment has a tensile strength of 20 to 35 kgf/mm$^2$ at a room temperature. The thickness of the electrolytic copper foil is 4 to 70 µm. The plating of the copper foil is performed in a copper electrolytic solution under a condition that a nickel concentration in the copper electrolytic solution is kept at 1000 ppm or lower and a chlorine concentration in the copper electrolytic solution is kept at 1 ppm or lower. The plating of the copper foil is performed in a copper electrolytic solution under a condition that a total organic carbon (TOC) concentration in the copper electrolytic solution is kept at 3 ppm or lower. Further, in the comparative example 1 to the comparative example 5 in the following table 1, when the room temperature tensile strength and TOC concentration in the electrolytic solution are outside the ranges specified in the examples of the present disclosure. The comparative examples show measurements of the resistance value after graphene synthesis in this context.

Referring to table 1 below, in the present example 1 of the present disclosure, TOC concentration is 1 ppm, the tensile strength at room temperature and the tensile strength at room temperature after thermal treatment are 51 kgf/mm$^2$ and 25 kgf/mm$^2$, respectively. In this case, the resistance value after graphene synthesis was 180 Ω/square. Further, in the case of the present example 3 and the present example 7, TOC concentration of 1 ppm and 2 ppm, respectively. The tensile strength at room temperature and the tensile strength at room temperature after thermal treatment were 57 kgf/mm$_2$ and 26 kgf/mm$_2$, respectively in the preset example 7. The tensile strength at room temperature and the tensile strength at room temperature after thermal treatment were 62 kgf/mm$_2$ and 28 kgf/mm$_2$, respectively in the preset example 3. The resistance values after the synthesis of graphene were 250 Ω/square and 280 Ω/square, respectively in the present example 3 and the present example 7. It may be seen that both have a resistance value of smaller than 300 Ω/square. When the resistance value after synthesis of graphene is smaller than 300 Ω/square, this means that graphene is easily synthesized on an electrolytic copper foil.

On the other hand, when we refer to the comparative example 1 in the following table 1, at TOC concentration of 100 ppm, the tensile strength at room temperature and tensile strength at room temperature after thermal treatment were 35 kgf/mm$^2$ and 30 kgf/mm$^2$, respectively. In this case, the resistance value after the synthesis of graphene was 400 Ω/square. Further, in the case of the comparative example 5, at TOC concentration of 1000 ppm, the tensile strength at room temperature and tensile strength at room temperature after thermal treatment were 40 kgf/mm$^2$ and 35 kgf/mm$^2$, respectively. In this case, graphene synthesis was not observed.

In the case of the comparative example 1 and the comparative example 5, the TOC concentration exceeds 3 ppm. Thereby, a lot of impurities exist in the copper foil. This has a great effect on recrystallization and so on such that the surface roughness of the electrolytic copper foil is negatively affected. As a result, the graphene synthesis is not properly performed. Referring to the tensile strength at room temperature of electrolytic copper foil, the tensile strength of the comparative example 1 and the comparative example 5 is outside the tensile strength range of the present examples. As a result, graphene synthesis is not properly performed. Otherwise, even when the synthesis takes place, there is a problem that graphene is not easily formed on the electrolytic copper foil because of high resistance value.

Therefore, it may be preferable that when manufacturing the electrolytic copper foil for graphene, the TOC concentration of copper electrolytic solution was kept below 3 ppm, and the electrolytic copper foil has a tensile strength of 45 to 70 kgf/mm$^2$ at a room temperature, wherein the electrolytic copper foil after thermal treatment has a tensile strength of 20 to 35 kgf/mm$^2$ at a room temperature.

TABLE 1

| Examples | Thickness (µm) | TOC concentration (ppm) | Ni concentration (ppm) | Tensile strength at room temperature (kgf/mm$^2$) | Tensile strength at room temperature after treatment (kgf/mm$^2$) | Resistance after graphene synthesis |
|---|---|---|---|---|---|---|
| Present Example 1 | 35 | 1 | 100 | 51 | 25 | 180 |
| Present Example 2 | 35 | 2 | 500 | 45 | 28 | 200 |
| Present Example 3 | 4 | 1 | 450 | 62 | 28 | 250 |
| Present Example 4 | 12 | 0.9 | 350 | 58 | 29 | 230 |
| Present Example 5 | 18 | 0.8 | 200 | 55 | 24 | 200 |
| Present Example 6 | 70 | 3 | 980 | 47 | 24 | 150 |
| Present Example 7 | 10 | 2 | 350 | 57 | 26 | 280 |
| Present Example 8 | 10 | 1 | 450 | 55 | 26 | 290 |
| Comparative Example 1 | 35 | 100 | 90 | 35 | 30 | 400 |
| Comparative Example 2 | 18 | 200 | 10 | 34 | 30 | No graphene synthesis |
| Comparative Example 3 | 12 | 80 | 30 | 38 | 31 | No graphene synthesis |
| Comparative Example 4 | 12 | 300 | 80 | 36 | 32 | 500 |
| Comparative Example 5 | 10 | 1000 | 40 | 40 | 35 | No graphene synthesis |

Those of ordinary skill in the art to which the present disclosure belongs may understand that the present disclosure may be embodied in other specific forms without departing from the spirit or essential characteristics thereof. It is therefore to be understood that the above-described embodiments are illustrative in all aspects and not restrictive.

The scope of the present disclosure is defined by the claims set forth below rather than by the above detailed description. All changes or modifications that come within the meaning and range of the claims and the equivalents thereof are to be construed as being included within the scope of the present disclosure.

What is claimed is:

1. An electrolytic copper foil for synthesis of graphene, wherein the electrolytic copper foil before thermal treatment has a tensile strength of 45 to 70 kgf/mm² at a room temperature, wherein the electrolytic copper foil after the thermal treatment has a tensile strength of 20 to 35 kgf/mm² at a room temperature,
   wherein the electrolytic copper foil includes nickel, the nickel, which serves as a seed in synthesis of graphene on the electrolytic copper foil, reduces electrical conductivity after the synthesis of the graphene on the electrolytic copper foil so that the graphene is uniformly formed on a surface of the electrolytic copper foil, and
   wherein a resistance of the copper foil after the synthesis of the graphene on the electrolytic copper foil is equal to or less than 300 Ω/square.

2. The electrolytic copper foil of claim 1, wherein the thermal treatment is carried out at a temperature of 180 to 220 degrees Celsius for 50 to 80 minutes.

3. The electrolytic copper foil of claim 1, wherein a thickness of the electrolytic copper foil is 4 to 70 μm.

* * * * *